Sept. 27, 1927.
W. H. FURNESS
1,643,299
APPARATUS FOR FILTERING
Filed Dec. 6, 1924
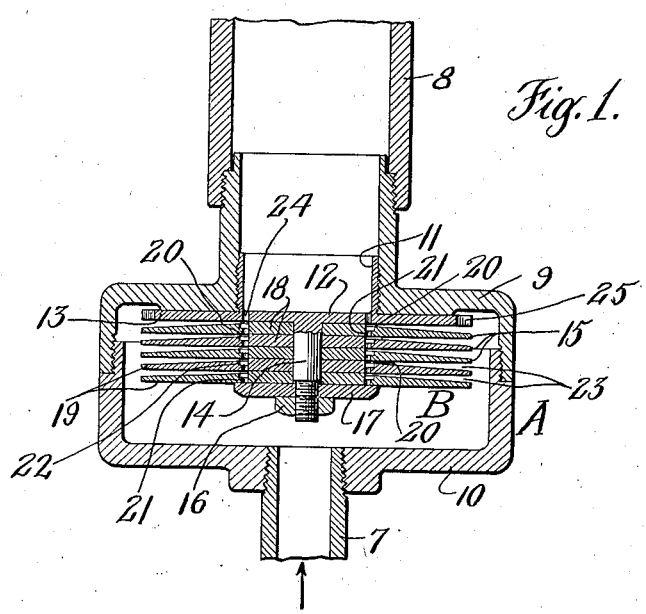
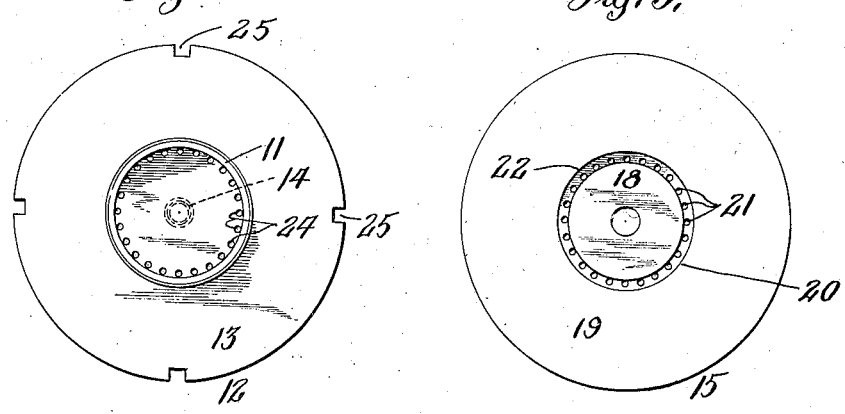
INVENTOR
William H. Furness
BY
Synnestvedt & Lechner
ATTORNEYS Patented Sept. 27, 1927.

1,643,299

UNITED STATES PATENT OFFICE.

WILLIAM H. FURNESS, OF NATIONAL PARK, NEW JERSEY, ASSIGNOR TO CELLOCILK COMPANY, OF PHILADELPHIA, PENNSYLVANIA, A CORPORATION OF DELAWARE.

APPARATUS FOR FILTERING.

Application filed December 6, 1924. Serial No. 754,254.

This invention relates to a method of and an apparatus for filtering fluids.

One of the primary objects of the invention is to provide a simple and effective filter which is easy to assemble and take apart and inexpensive to manufacture.

Another object is to provide a filter in which the filtering element may be readily removed either as a unit or in pieces, so that the parts thereof may be thoroughly cleaned in a convenient manner and with a minimum of time loss.

Still another object is to provide a filter through which the fluid may be passed under pressure without danger of destroying the filtering element.

Still another object of the invention is to provide a filter in which the particles to be removed are progressively filtered out in a series from larger to smaller so that removal of particles is effected over an extended area.

Still another object is the provision of a filter which will function for a maximum period of time before it requires cleaning.

How these and other advantages can be realized through the invention will become apparent from the description hereinafter of the best embodiment known to me.

In the drawings Fig. 1 is a sectional elevation through a filter constructed in accordance with my invention.

Fig. 2 is a plan view of the carrier member of the filtering element.

Fig. 3 is a plan view of one of the plates of the filtering element.

In Fig. 1 I have shown the filter as composed of a casing A and a filtering element or unit indicated as a whole by the reference character B, the casing being provided with a pipe 7 through which the fluid to be filtered is admitted and a pipe 8 through which the filtered fluid is delivered to the point of use. The casing A as here shown is made up of the upper and lower castings 9 and 10 respectively it being understood of course that this construction does not form part of my invention and may be made in any number of different ways.

The filtering element B is secured to the casing A in any suitable manner in this instance it is secured to the upper casting 9 by means of the threaded neck 11 on the carrier 12 of the filtering element. The carrier 12 is provided with a plate like portion 13 and an extending shank or stud 14 adapted to receive a plurality of plates 15 which together with the carrier 12 comprises the filtering element or unit B. The particular construction and function of the plates forms an important part of this invention and will be hereinafter more fully described. The plates 15 are secured to the carrier by any suitable means, such as the nut 16 and washer 17.

While I have shown five plates in the drawings it is to be understood that any number of plates may be used according to the particular service for which the filter is intended. In small capacity installations even a single plate might be used in combination with the casing of the filter.

Reverting now to the construction of the plates 15 for the filtering unit it will be seen that each plate is provided with a flat central portion 18, surrounded by a tapering portion 19. As here shown the entire lower surface of the plate is flat while the upper surface is flat only to the extent of the central portion 18 at which portion the plate is thickest. The upper surface of the portion 19 tapers toward the lower surface of the plate from a point 20 slightly below the upper surface of the flat portion 18 to the periphery of the plate. If desired however both surfaces of the portion 19 may be tapered for purposes which will become apparent hereinafter. A series of holes 21 forming passages through the plates are provided adjacent the flat portion 18 thereof. Communication between the holes is established by means of a channel or groove 22 in the face of the plates.

To assemble the filtering element or unit, a number of plates 15 are mounted on the shank or stud 14 of the carrier 12 and secured thereto by means of the nut and washer 16 and 17, the washer being of sufficient size to cover the holes 21 in its adjacent plate 15. Thus it will be seen that when the unit is assembled the flat portions of the plates abut and tapering spaces are provided between the tapering portions thereof. Stated in another way spaces 23 are provided between the tapering portions of the plates 15 which flare outward to the periphery, a slight space being provided between the plates adjacent the central flat portion thereof by virtue of the taper flaring outward from a point slightly below the uppermost surface of the plate. It is this spacing which determines the degree to which filtering is effective.

In operation fluid is admitted to the casing A through the pipe 7 and then seeks its way into the spaces 23 between the plates, it being directed against the flare, that is to say it enters the spaces at the periphery where the spaces are largest and is forced inward against the tapering surfaces thereof and thence through the shallow slit like space at 20 at the base of the flare, through the holes or passages 21, filling the channels or grooves 22 and finally through the passages or holes 24 in the carrier 12 into the delivery pipe 8. In short the fluid is admitted peripherally of the filtering element and delivered axially thereof through the delivery pipe 8.

An outstanding and important feature of my invention is the manner in which the particles to be separated are automatically segregated according to size, the larger particles being eliminated nearest the inlet point while the smaller particles are free to pass on until stopped at a point where the decreasing size of the space no longer will allow them to pass on. Thus it will be seen that the filter will function for a maximum period owing to the particles becoming segregated over an extended area instead of all (large and small) collecting at the entrance point of the filtering element. It is also to be pointed out that even after a considerable number of the larger particles have collected at the entrance the smaller particles will find their way through the voids between the larger particles thereby greatly extending the effective period of the filter. For such reasons, together with the fact that the fluid is admitted at the entire periphery of the filtering element thus presenting a large effective area, clogging becomes only a secondary consideration as compared to filters in use prior to my invention.

The convenient manner in which the filter plates 15 may be removed or in fact the filtering unit B as a whole, makes for a minimum loss of time when it is desired to clean the filter. The filter unit B may be quickly removed by inserting a spanner wrench in the notches 25 provided for that purpose in the carrier 12, and a new one inserted to replace it while it is being cleaned. The units can be inexpensively manufactured owing to their simple construction so that a number thereof may be kept on hand with very little expense. Obviously a filtering element constructed in accordance with my invention would have long life, there being no parts to break or chip off and carry through with the fluid as is the case in many existing filters especially those using mass materials such as glass wool for instance.

The plates of the filter can be inexpensively replaced should they become ineffective from abuse or corrosion when used for filtering liquids containing acids. In such cases however the life could be greatly extended by making the plates of special compositions.

The filter is particularly useful in the filtering of viscous liquids used in the manufacture of artificial silk. It has been found that proper filtration for such purpose is effected by making the dimension of the slit like space approximately .001" and the space at the periphery approximately .010".

If desired, the plates may be tapered in the opposite direction from that shown in which case the fluid would enter at the center and be delivered at the periphery of the plates. The advantages realized from the tapering spaces as previously described would also be manifest in such reverse arrangement.

I claim:—

A plate for a filtering unit of the character described of diminishing thickness from the fluid outlet point to the fluid inlet point, having passages through the plate adjacent the thickest portion and a channel establishing communication between the passages.

In testimony whereof, I have hereunto signed my name.

WILLIAM H. FURNESS.